United States Patent [19]

Jungles et al.

[11] 3,927,253
[45] Dec. 16, 1975

[54] OPTICAL DIFFRACTOMETERS

[75] Inventors: John Jungles, Thurmaston; David John Whitehouse, Melton Mowbray; Eric Gordon Nightingale, Leicester, all of England

[73] Assignee: The Rank Organisation Ltd., London, England

[22] Filed: Mar. 22, 1974

[21] Appl. No.: 454,009

[30] Foreign Application Priority Data
Mar. 22, 1973 United Kingdom............... 13831/73

[52] U.S. Cl. ................. 178/6.8; 178/DIG. 1; 358/5
[51] Int. Cl.² ........................................... H04N 7/18
[58] Field of Search .......... 350/162 SF; 178/DIG. 1; 178/6.8; 358/47, 5, 6

[56] References Cited
UNITED STATES PATENTS

| | | | |
|---|---|---|---|
| 3,045,531 | 7/1962 | Prescott | 350/162 F |
| 3,409,872 | 11/1968 | Hogg et al. | 178/DIG. 1 |
| 3,435,411 | 3/1969 | Lawrence | 350/162 SF |
| 3,451,755 | 6/1969 | Silverman | 350/162 SF |
| 3,480,933 | 11/1969 | Treves | 350/162 SF |
| 3,520,610 | 7/1970 | Parrent | 350/162 SF |
| 3,729,252 | 4/1973 | Nelson | 350/162 SF |
| 3,729,634 | 4/1973 | Jensen | 350/162 SF |
| 3,816,647 | 6/1974 | Chang | 178/DIG. 1 |

Primary Examiner—Howard W. Britton
Assistant Examiner—Michael A. Masinick
Attorney, Agent, or Firm—Brisebois & Kruger

[57] ABSTRACT

A diffractometer of the type comprising a light source, an image transformation unit and an image reconstruction unit, in which the image transformation unit includes a condenser lens, is provided with an adjustable aperture stop in the focal plane of the condenser lens. A further adjustable aperture stop may be provided at the entrance pupil of a collimating lens of the image transformation unit. A television camera is positioned to receive light from the diffractometer and a further lens is used to adjust the focus to either the transform plane or the image plane of the instrument, adjustment of one or both of the stops adjusting the transform or the image quality.

3 Claims, 1 Drawing Figure

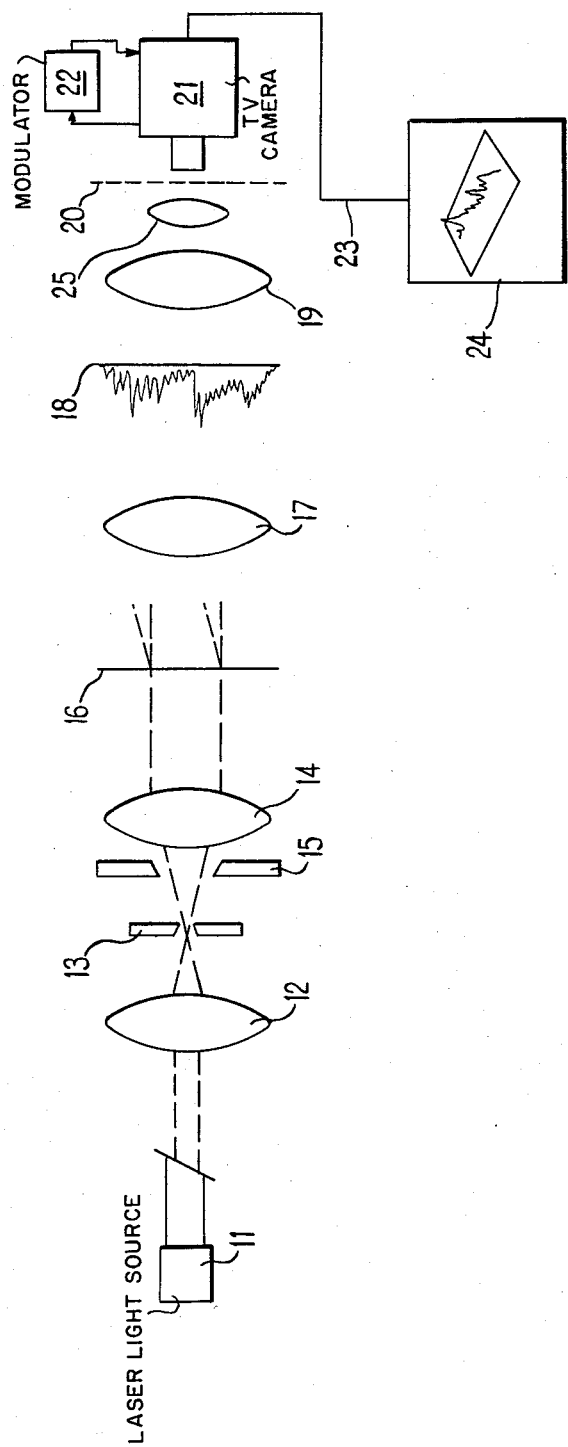

OPTICAL DIFFRACTOMETERS

The present invention relates to optical diffractometers and particularly to diffractometers which are adjustable to change the resolution of images located at various planes in the diffractometer system to vary the quality of interpretation of such images.

Known optical diffractometers essentially comprise three units, a light source, which is normally a laser which produces a coherent light beam, for example a helium-neon laser producing light at 6,328 Angstrom units, a transformation unit, in which is located the transparency or other object, and a reconstruction unit which reconstructs the required image of the object. The light source used in such diffractometer systems is normally operated in the $TEM_{00}$ mode, and the light emitted from the laser is condensed onto a pin hole by a condenser lens. This arrangement acts to inhibit stray light and to cut out unwanted modes of the laser. The pinhole aperture, or stop, is located in the front focal plane of a lens which acts as a beam expander and collimator, and the object, such as a transparency, is located in a position such that the collimated light falls on the selected area thereof. The light falling on the object is diffracted thereby and the diffracted light is collected by a transform lens and focused at a plane known as the transform plane. The optical information which can be obtained from this plane is important because it represents the Fourier spectrum of the spatial variations of optical transmission across the object. Certain parts of the spectrum can be modified by selectively transmitting part of the light in the transform plane. In this way, periodic or random features present in the object can be illuminated or enhanced as required.

Light passing through the transform plane is focused by an image lens at an image plane at which the image is reconstructed.

In such known optical diffractometer systems it is difficult to optimise the conditions for viewing both the transformed image, that is the image produced by light focused at the transform plane and the reconstructed image of the object, that is light focused at the image plane, without modification to the apparatus. Similarly, it is difficult to form visual assessments of position and relative intensity of the images in regions where there are only small variations in adjacent bright spots. These problems arise for a number of different reasons. The constriction of the beam from the $TEM_{00}$ mode by the pin hole is effected in order to ensure that the resultant beam is very nearly uniform in intensity across its width, because the normal distribution across a beam in the $TEM_{00}$ mode is Gaussian. Uniform illumination is however, desirable. But this restriction to the single mode of the laser does have the disadvantage that the coherence length of the source is long and this means that the production of interference fringes between different optical elements in the system is likely; such fringes detract from the quality of the eventual images, particularly when compressed or folded systems having elements which lie close together are used.

Moreover, because of the good coherence of the light of a single mode selected from the laser, dust particles between the pinhole and the image plane tend to produce interference in the image plane. In addition the image may be degraded by speckle, which is a phenomenon associated with the spatial coherence and the viewing aperture. Earlier known proposals to reduce these deleterious effects on the image include rotating the lenses of the system, or by inserting an optical diffuser into the system and relying on the subsequent integrating effect of the eye or camera to "smooth out" the specific detail. The present invention now seeks to provide an optical system in which the above mentioned disadvantages are reduced.

According to the present invention, there is provided an optical diffractometer of the type comprising a laser as light source, an image transformation unit, and an image reconstruction unit, in which the laser is a multimode device and the image transformation unit includes a condenser lens and an adjustable pin hole stop in the rear focal plane of the condenser lens, whereby adjustments to the size of the said stop effect adjustments to the image transform quality.

When used in this specification the term "front focal plane" of a lens will be understood to refer to that focal plane nearest the light source of the system in which the lens is situated. The term "rear focal plane" will be used correspondingly to refer to the focal plane furthest from the light source.

In embodiments of the present invention adjustment can be made to obtain the optimum results from the system for both the transform and the image.

Preferably the image transformation unit includes a collimator lens with a further adjustable aperture stop located at the entrance pupil thereof. Adjustments to the stop at the entrance pupil of the collimator lens permits a certain degree of control over the intensity distribution across the beam. This allows a more uniform illumination of the objects at different points thereof as the light is moved over successive areas of interest, and also ensures that the transform produced is less dependent upon the artificial importance given to different regions of the transparency by poor illumination. Thus, reduction of the size of the pinhole aperture at the focal plane of the condenser lens, together with reduction of the size of the aperture at the entrance pupil of the collimator lens will both have the effect that the transform quality will be improved at the expense of a certain loss of light. On the other hand, enlargement of the or each pinhole aperture will improve the image quality. By adjustment of the two adjustable apertures in the system it is therefore possible to optimise the conditions for viewing at the transform plane and the image plane; with the system defined above, it is possible to obtain a better compromise than has heretofore been possible with a given diffractometer apparatus.

One embodiment of the present invention will now be more particularly described, by way of example, with reference to the accompanying drawing which is a schematic diagram illustrating the embodiment.

In the drawing, there is an optical diffractometer comprising a laser source of light 11 which is a multimode laser producing light in both the $TEM_{00}$ mode and also other modes. The laser light is passed to a condenser lens 12 which focuses the light at an adjustable pinhole aperture 13 which is located in the rear focal plane of the lens 12. The light is then passed through a collimator lens 14 which has a variable aperture stop 15 at the entrance pupil thereof. The collimator lens 14 also acts as a beam expander to produce a broad collimated beam which is directed into an object 16, such as a transparency, which diffracts the light in a known way.

The diffracted light from the object 16 is collected by a transform lens 17 and focused at a transform plane 18. The information obtained at the transform plane is of importance since this represents the Fourier spectrum of the spatial variations of transmission across the object. Since the object will frequently be larger than the diameter of the light beam from the collimator lens 14 the position of the object 16 at the object plane between the lenses 14 and 17 will have to be laterally adjusted to the individual areas of interest and the information withdrawn from viewing the transform plane recorded for a comparison to be made.

From the transform plane light passes to an imaging lens 19 which focuses the light at an image plane 20 to form a reconstructed image of the object. A television camera 21 is located to view the light from the diffractometer and can be focused either at the image plane 20 or the transform plane 18 by interposition or removal of a lens 25 between the imaging lens 19 and the image plane 20. The television camera 21 includes modulating means 22 which modulate the line scan of the television camera 21 by a Y signal proportional to the television camera tube beam current together with an amount of shift proportional to the line position. The signal from the television camera 21 is passed on a line 23 to a monitor display screen 24. By modulating the camera line scan in this way it is possible to produce a picture representing the transform or the image in the diffractometer, depending on the focus of the camera 21, in a pseudo three-dimensional form.

By adjustments to the two variable aperture stops, that is the pinhole aperture 13 and the entrance pupil aperture 15 light of modes other than the $TEM_{00}$ mode can be allowed into the optical system from the laser. This is achieved because modes other than the purely axial are geometrically separated in space in the focal plane of the condenser, and suitable adjustments to the size and position of the pinhole stop enable a degree of discrimination to be achieved. Thus adjustment or replacement of the pinhole aperture effectively modifies the point source corresponding to the $TEM_{00}$ mode into an extended source rather than a source of the type which would be produced by simple diffraction and a single mode operation. The effective size of the extended source will tend to smooth out dust fringes and speckle effects.

Adjustments made to the size of the aperture 15 at the entrance pupil of the collimator lens 14 allows a certain degree of control of the intensity distribution across the beam to be made without substantially altering the spatial coherence of the source. The adjustments to the entrance pupil aperture 15 and the pinhole aperture 13, as mentioned above, allow control of the light beam such that this approximates to a uniform intensity distribution across its width, so that the object, and thus the reconstructed image, are more uniformly illuminated; this improves the resolution of the image, that is the image quality. One advantage arising from this is that as mentioned above, the transform produced is less dependent upon the artificial importance given to different regions of the transparency by poor illumination thus improving the transform quality, that is the resolution of the image at the transform plane. The use of a television camera in place of the eye or known photographic recording techniques allows the production of a pseudo three-dimensional display which facilitates the determination of relative intensity and the spatial position of information without the requirement for micro-densitometers.

We claim:

1. In an optical diffractometer system of the type comprising:
    a laser as light source,
    holder means for supporting an object,
    an image transformation unit for providing a Fourier transform of an object carried by said object holder means, and
    an image reconstruction unit including means for focusing an image transform at a transform plane and a reconstructed image at an image plane,
  the improvement wherein:
    said laser is a multimode device, and
    said image transformation unit includes
      a condenser lens,
      a first adjustable aperture stop positioned in the focal plane of said condenser lens, such that adjustments to the size of said aperture stop effect adjustments to said image transform quality,
      a collimator lens from which substantially plane parallel light is directed towards an object carried by said object holder means, and
      a second adjustable aperture stop located at the entrance pupil of said collimator lens, between said first adjustable aperture stop at the rear focal plane of said condenser lens and said collimator whereby adjustments to the size of said further adjustable aperture stop effect adjustments to one or both of said transform image at said transform plane and said reconstructed image at said image plane.

2. The optical diffractometer of claim 1 further including a television camera positioned to receive light from said image reconstruction unit, there being further provided means for focussing said television camera either at said transform plane or at said image plane whereby to display either said Fourier transform image or said reconstructed image.

3. The optical diffractometer of claim 2 wherein said means for focussing said television camera at said transform plane or at said image plane, comprises a lens mounted between said transform plane and said image plane and displaceable laterally of the optic axis of said camera whereby to focus light from said transform plane on said television camera when in position.

* * * * *